(12) United States Patent
Spitzer et al.

(10) Patent No.: US 8,478,841 B2
(45) Date of Patent: Jul. 2, 2013

(54) SYSTEMS AND METHODS FOR MANAGING ELECTRONICALLY DELIVERED INFORMATION CHANNELS

(76) Inventors: Kenneth J. Spitzer, Weston, MA (US); Robert J. Dunphy, Guttenberg, NJ (US)

(*) Notice: Subject to any disclaimer, the term of this patent is extended or adjusted under 35 U.S.C. 154(b) by 616 days.

(21) Appl. No.: 12/143,366

(22) Filed: Jun. 20, 2008

(65) Prior Publication Data
US 2009/0319356 A1 Dec. 24, 2009

(51) Int. Cl.
*G06F 15/16* (2006.01)
(52) U.S. Cl.
USPC ........... 709/218; 709/203; 709/206; 709/219
(58) Field of Classification Search
USPC ...... 709/201, 203–208, 217–219; 725/45–47; 455/3.03, 414.3
See application file for complete search history.

(56) References Cited

U.S. PATENT DOCUMENTS

| | | |
|---|---|---|
| 2001/0018858 A1 | 9/2001 | Dwek |
| 2005/0171832 A1 | 8/2005 | Hull et al. |
| 2007/0112762 A1 | 5/2007 | Brubaker |
| 2007/0208751 A1 | 9/2007 | Cowan et al. |
| 2007/0220553 A1* | 9/2007 | Branam et al. .................. 725/46 |
| 2007/0233569 A1 | 10/2007 | Kelley et al. |
| 2007/0282675 A1 | 12/2007 | Varghese |
| 2008/0004959 A1 | 1/2008 | Tunguz-Zawislak et al. |
| 2008/0083003 A1 | 4/2008 | Biniak et al. |
| 2008/0098313 A1 | 4/2008 | Pollack |
| 2008/0098450 A1* | 4/2008 | Wu et al. ....................... 725/132 |
| 2008/0134043 A1* | 6/2008 | Georgis et al. ................ 715/733 |
| 2008/0141307 A1* | 6/2008 | Whitehead ...................... 725/46 |
| 2008/0222283 A1* | 9/2008 | Ertugrul et al. ............... 709/224 |
| 2008/0242221 A1* | 10/2008 | Shapiro et al. .............. 455/3.06 |
| 2008/0248788 A1* | 10/2008 | Smith et al. ................ 455/414.3 |
| 2008/0271080 A1* | 10/2008 | Gossweiler et al. ............ 725/47 |

* cited by examiner

*Primary Examiner* — Ashok Patel
*Assistant Examiner* — Kevin Bechtel
(74) *Attorney, Agent, or Firm* — Foley & Lardner LLP; James C. De Vellis

(57) ABSTRACT

Systems and methods for managing electronically delivered information channels are provided. A selection of non-textual category data and a plurality of subscriber interest category data are received from a subscriber. Content associated with the non-textual category data and content associated with the subscriber interest category data are identified. The systems and methods can create a subscriber channel associated with the subscriber. The subscriber channel is configured to provide the content associated with both the non-textual category data and the subscriber interest category data to the subscriber. Through the subscriber channel, the content associated with the non-textual category data can be provided to the subscriber in a first format configured for display on a first device. At substantially the same time, through the subscriber channel, the content associated with the subscriber interest category data to the subscriber in a second format configured for display on a second device can be provided.

28 Claims, 7 Drawing Sheets

SYSTEMS AND METHODS FOR MANAGING ELECTRONICALLY DELIVERED INFORMATION CHANNELS

BACKGROUND OF THE INVENTION

1. Field of the Invention

Aspects of the present invention are directed to computer implemented systems and methods for managing electronically delivered information channels, and more particularly to systems and methods for providing information for use in a social network.

2. Discussion of the Related Art

Interactive Internet radio services allow a client to create a customized radio station. A client can request a favored genre of music, as well as individual songs or artists, and the radio service provides a customized radio station that at least in part satisfies this request. These customized radio stations can be transmitted through the Internet. The client who created the customized radio station typically accesses a particular website, and after an authentication procedure the client may listen to his or her customized radio station. Other clients may also access a website associated with the customized radio station to see what type of music is played on customized radio stations created by other clients. This allows clients to listen to customized radio stations created by other clients.

Social networks are online communities of clients who share a common interest or activity. A client joins a social network service and may be provided with access to a personal web page. The client may customize the web page by adding digital pictures or personal information about the client's life. Clients can invite other clients to access their personal web pages. Typically upon mutual consent, two clients may become friends so that at least portions of each client's web page are accessible via the other client's web page. As a result, one client can view the interests or activities of another client when the two are classified as friends.

Customized radio stations and client web pages of social network services increase their client bases by building on existing family, social, or business acquaintances or relationships. Absent a pre-existing connection, such as a connection via an intervening client, it is difficult for a client to find other clients that share the same focused interests. Clients become friends with other clients on a social network based on incomplete matches of a common interest, acquaintance, or activity, and a clients desire to make a more comprehensive match based on a robust set of interests remains unfulfilled. Similarly, client access to a customizable radio station of another client is based on an incomplete match of a common musical preference. Here too, a clients desire to connect with other clients having a more robust set of interests remains unfulfilled.

SUMMARY OF THE INVENTION

Aspects and embodiments of the present invention are directed to computer implemented systems and methods for managing electronically delivered information channels. A subscriber to a service can provide different categories of comprehensive information identifying the subscriber's activities, hobbies, and preferences. A service receives both non-textual (e.g., audio, video, or musical) data as well as interest category data (e.g., hobbies, activities, professional interests) from a subscriber. The service identifies content associated with the received data from both categories and creates a subscriber channel where this content can be provided. Through the subscriber channel, the service can provide the content associated with the non-textual data in a format for display on a device. At substantially the same time, the service can also provide, through the subscriber channel, the content associated with the subscriber interest category data in another format for display on another device.

At least one aspect is directed to a computer implemented method for managing electronically delivered information channels. The computer implemented method receives, from a subscriber, a selection of non-textual category data and a plurality of subscriber interest category data. The computer implemented method can identify content associated with the non-textual category data and content associated with the subscriber interest category data. The computer implemented method can create a subscriber channel associated with the subscriber. The subscriber channel is configured to provide the content associated with both the non-textual category data and the subscriber interest category data to the subscriber. The computer implemented method can provide, through the subscriber channel, the content associated with the non-textual category data to the subscriber in a first format configured for display on a first device. At substantially the same time, the computer implemented method can provide, through the subscriber channel, the content associated with the subscriber interest category data to the subscriber in a second format configured for display on a second device.

In various embodiments, the subscriber channel may include a plurality of subchannels. The computer implemented method may identify a plurality of formats compatible with the first device, and provide one of the subchannels to the first device in the first format, where the first format is selected from one of the plurality of formats. The computer implemented method may also identify a plurality of formats compatible with the second device, and provide one of the subchannels to the second device in the second format, where the second format is selected from one of the plurality of formats. The computer implemented method may also provide, through the subscriber channel, non-textual category data content to a plurality of users in the first format. At substantially the same time, the computer implemented method can provide, via the subscriber communication channel, the content associated with the subscriber interest category data to the plurality of users in is the second format. In one embodiment, the content associated with the subscriber interest category data can be provided to the subscriber and to the plurality of users in the first format. The computer implemented method can receive, from a plurality of users, user interest category data, and can provide, to one of the plurality of users, the content associated with the non-textual category data responsive to an evaluation of the subscriber interest category data and the user interest category data.

At least one other aspect is directed to a channel personalization engine in a computer network. The channel personalization engine includes a data storage unit that is configured to store non-textual category data and a plurality of subscriber interest category data associated with the subscriber. The channel personalization engine can identify content associated with the non-textual category data and content associated with the subscriber interest category data. The channel personalization engine can generate a subscriber channel associated with the subscriber, where the subscriber channel is configured to include the content associated with the non-textual category data and the content associated with the subscriber interest category data. The channel personalization engine is configured to provide, via the subscriber channel, the content associated with the non-textual category data in a first format to the subscriber. The channel personalization engine is further configured to provide, via the subscriber channel, the content associated with the subscriber interest category data in a second format to the subscriber.

In various embodiments, the channel personalization engine can provide content associated with non-textual category data to a plurality of users in a first format, and can provide content associated with the subscriber interest category data to the plurality of users in the second format. The channel personalization engine can also provide, to the users, content associated with non-textual category data responsive to an evaluation of subscriber interest category data and user interest category data. In one embodiment, the subscriber channel may include a plurality of subchannels, and the channel personalization engine may identify a plurality of formats compatible with the first device or the second device, and may provide one of the subchannels to either device in at least one of the plurality of formats.

Aspects and embodiments described herein are achieved by the methods and systems according to independent claim 1 and any other independent claims. Further details may be found in the remaining dependent claims.

Other aspects, embodiments, and advantages of these exemplary aspects and embodiments will become apparent from the following detailed description, taken in conjunction with the accompanying drawings, illustrating the principles of the invention by way of example only. It is to be understood that the foregoing information and the following detailed description include illustrative examples of various aspects and embodiments, and are intended to provide an overview or framework for understanding the nature and character of the claimed aspects and embodiments. The drawings, together with the remainder of the specification, serve to explain principles and operations of the described and claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. The foregoing and other objects, features, and advantages of the systems and methods disclosed herein will be more fully understood from the following description of various embodiments, when read together with the accompanying drawings, in which.

DETAILED DESCRIPTION

Figure 1:
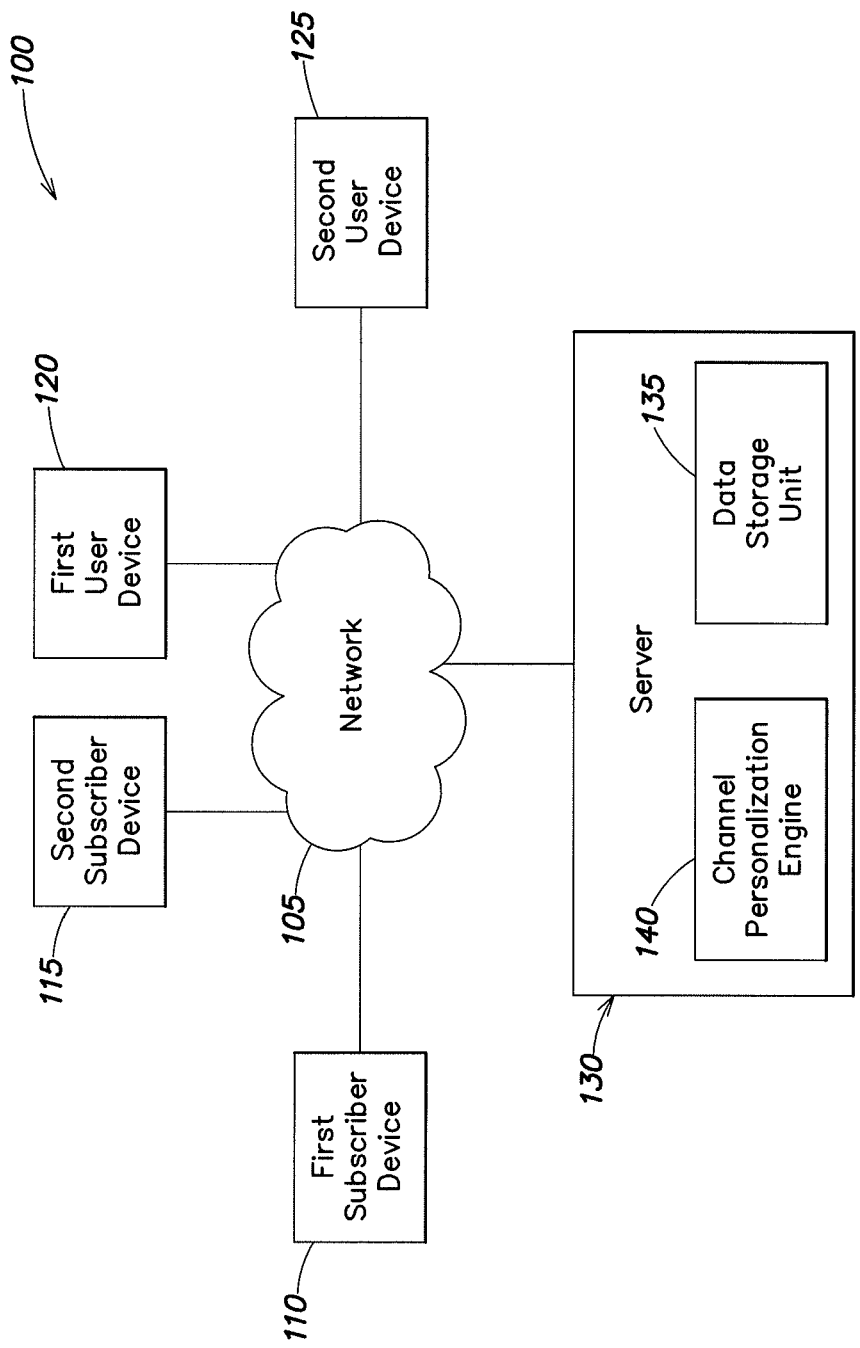
FIG. 1 is a block diagram depicting an example system for providing information channels in accordance with one embodiment of the invention.

The invention is illustrated by a detailed description of various aspects and embodiments thereof. The systems and methods described herein are therefore not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including" "comprising" "having" "containing" "involving" and variations thereof herein, is meant to encompass the items listed thereafter and equivalents thereof as well as additional items.

Various aspects and embodiments are directed to computer implemented methods for managing electronically delivered information channels. As discussed herein, a subscriber can provide information to a service to create a subscriber channel. The subscriber channel can include non-textual data content and subscriber interest category content. At least some of this content can be provided to the subscriber via the subscriber channel, at substantially the same time, in a plurality of formats to a plurality of devices. This information can also be provided to one or more users, based, for example, on an evaluation of interest categories provided by the user.

FIG. 1 is a block diagram depicting an example system 100 for providing information channels in accordance with one embodiment of the invention. System 100 generally includes at least one network 105 such as the Internet or other group of interconnected computers. For example, network 105 may include any of a local area network, wide area network, metro area network, wireless networks, and telephone networks, among others. In one embodiment, network 105 connects a plurality of devices, including first subscriber device 110, second subscriber device 115, first user device 120, and second user device 125. Any of subscriber and user devices 110, 115, 120, and 125 may include, for example, a personal computer, mobile telephone, personal digital assistant, MP3 player, portable media player, or other device that can interface with network 105 to receive, transmit, execute, or display data.

In one embodiment, a subscriber can join a service whereby the subscriber may form at least one subscriber channel. Subscriber channels can provide personalized content of the subscribers choosing to network 105. For example, a subscriber channel can provide personalized, subscriber defined music streams as well as additional subscriber defined content, such as news or information content. Combining this content creates a highly customized subscriber channel. In one embodiment, a subscriber channel can be linked to a web page of the Internet and associated with the subscriber. This web page may display or execute all or part of the subscriber channel, as well as additional information, such as an indication of other users who may access the subscriber channel, or audio and text links to further information associated with content of the subscriber channel. The subscriber, as well as other users of the service, can receive the subscriber channel in a plurality formats on a plurality of devices, such as at least one of first subscriber device 110, second subscriber device 115, first user device 120, and second user device 125.

In one embodiment, a subscriber provides information used to generate a subscriber channel to at least one server 130 associated with a subscriber channel service. Server 130 may include at least one computer or other device that provides client devices such as first subscriber device 110, second subscriber device 115, first user device 120, and second user device 125 with access to data via network 105.

The information provided by a subscriber can include multiple categories of data. For example, a subscriber may enter data identifying non-textual categories into one of first subscriber device 110 or second subscriber device 115. Examples of non-textual categories include indications of preferred audio or video data, such as individual songs, music or music videos by one or more identified artists, or at least one genre, class, or category of music or other audio or video data. Non-textual categories may also include audio or video information in non-musical categories, such as sports, movies, or news events. Continuing with this example, a subscriber may enter data identifying non-textual categories of interest, such as data indicating the subscriber is interested in blues music, political news, and Boston Celtics basketball game broadcasts. A subscriber may enter this information into, for example, a computer or personal digital assistant for transmission through network 105 to server 130, where it can be stored in at least one data storage unit 135. Data storage unit 135 may include random access memory or other devices to which digital data may be written to, read from, or retained in. In one embodiment, data storage unit 135 stores non-textual data associated with a subscriber. Data storage unit 135 can store non-textual category data and subscriber interest category data, both of which can be provided by a subscriber.

It should be appreciated that a subscriber may enter this information in a text form, e.g., by typing on a keyboard to input information indicative of non-textual categories. In one embodiment, it is the content of the categories themselves that can be non-textual (e.g., audio). For example, a subscriber may join a service associated with server 130 whereby the subscriber can input information used to create a subscriber channel. A subscriber, using for example first subscriber device 110, may be prompted to identify or select non-textual categories that are of interest to the subscriber. In response, a subscriber can type data indicating the subscriber's preferred non-textual categories. In one embodiment a subscriber can select from a plurality of non-textual data categories that are provided by server 130 and displayed on, for example, first subscriber device 110. This selection can be made, for example, by the subscriber clicking on links or boxes indicative of non-textual data categories.

In one embodiment, a subscriber also enters, into one of first subscriber device 110 or second subscriber device 115, data identifying subscriber categories for transmission via network 105 to server 130. Subscriber categories, which can include content in textual or non-textual forms, may include, for example, news, sports, entertainment, music, current events, national, professional, business, fashion, technology, home and garden, health, family, or recreational categories in which a subscriber has an interest. Further examples include interests in books, computers, fitness, movies, travel, cars, finance, food, and gardening. Examples of music categories, (e.g., non-textual categories) include pop, rhythm & blues, country, soft pop, blues, reggae, rock, rap, classic rock, latin, foreign, and hip-hop. Professional or business categories can include trade organizations, guilds, unions, and formal or informal associations. It is appreciated that these lists are exemplary and not exhaustive. Information identifying these categories and associating them with a subscriber can be stored in data storage unit 135.

System 100 may also include at least one channel personalization engine 140. Channel personalization engine 140 may form part of server 130 and can include at least one search engine and data storage unit 135. In one embodiment, channel personalization engine 140 can identify content associated with the non-textual category data and content associated with the subscriber interest category data. For example, channel personalization engine 140 may include a search engine that searches network 105 to identify content. Channel personalization engine 140 may also evaluate one or more lookup tables or data indexes stored in data storage unit 135 or associated with network 105. In one embodiment, channel personalization engine 140 can identify, receive, or aggregate content associated with non-textual category data and content associated with subscriber interest category data.

Figure 2:
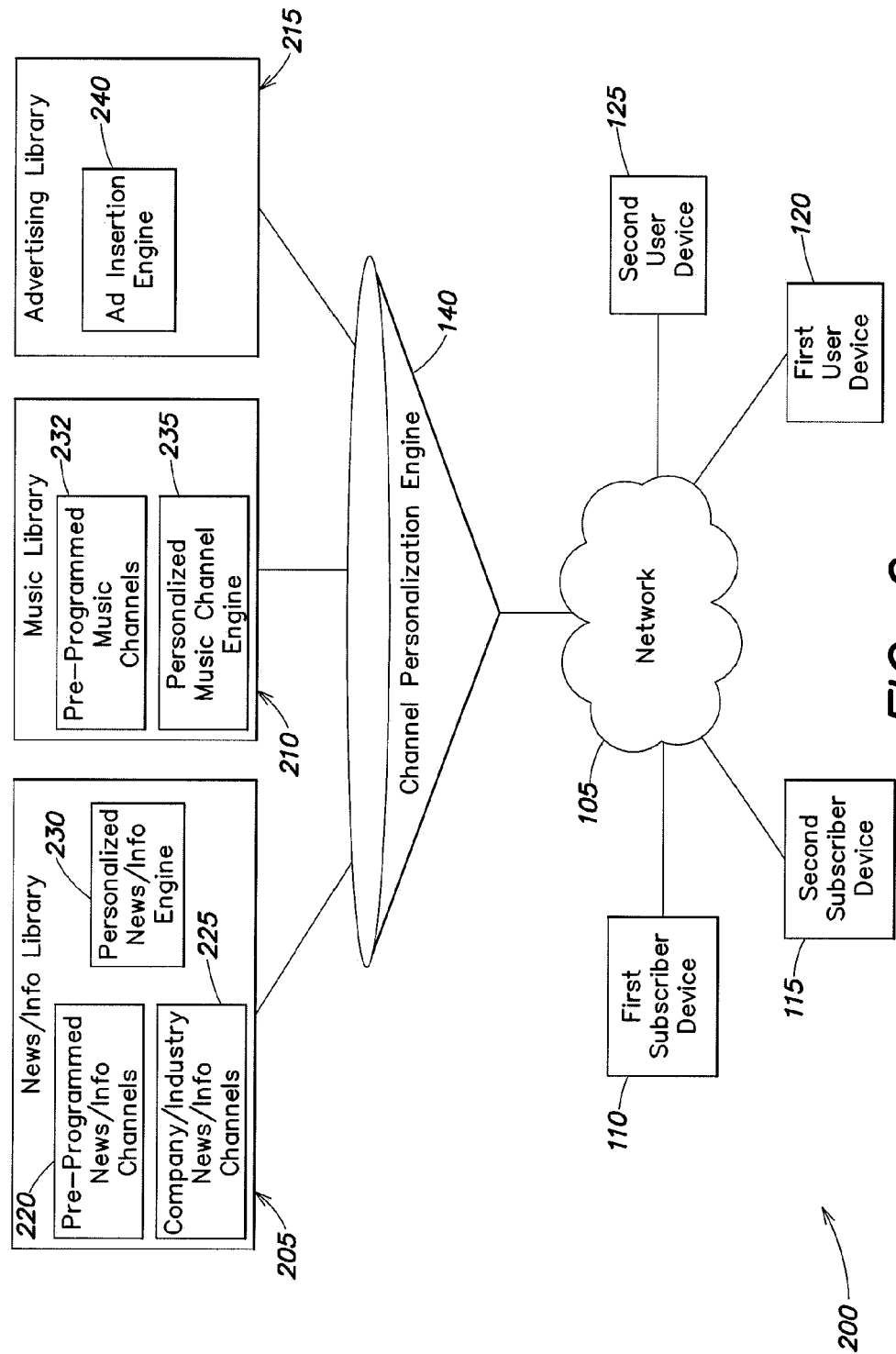
FIG. 2 is a block diagram depicting a channel personalization engine in accordance with one embodiment of the invention.

For example, and with reference to FIG. 2, to obtain content associated with either non-textual or subscriber interest category data, channel personalization engine 140 may access at least one news or information library 205, music library 210, and advertising library 215, each of which may be associated with data storage unit 135 or accessible via network 105. In one embodiment, news library 205 may include at least one pre-programmed news channel 220, which generally includes a news channel with content related to a common topic or topics. Examples of pre-programmed news channels include channels with content focused primarily toward sports, weather, current events, politics, entertainment, gossip, or local, regional, domestic, or international events. Pre-programmed news channel 220 may provide news or information content in a plurality of formats, such as text, audio, video, or combinations thereof. In one embodiment, channel personalization engine 140 provides all or part of pre-programmed news channel 220 to at least one of first subscriber device 110 and second subscriber device 115 via network 105.

News library 205 may also include at least one industry channel 225. Industry channel 225 may provide content (e.g., text, audio, or video) from various points of network 105 to channel personalization engine 140. Examples of this content include information regarding a particular company, business, trade, or association. For example, industry channel 225 can include a content channel with programming regarding a single trade, such as blacksmiths, teachers, or lawyers. Industry channel 225 can also include news about a particular company. News library 205 may also include at least one personalized news engine 230. In one embodiment, personalized news engine 230 includes a personalized channel created in response to subscriber interest category data. For example, if a subscriber interest category indicates an interest in antique cars, personalized news engine 230 may search devices and storage units associated with network 105 to aggregate data regarding antique car shows in a certain geographic area or time period. In one embodiment, personalized news engine 230 includes data associated with subscriber interest category data. Categories of subscriber interest may include, for example, categories of news, sports, entertainment, gossip, music, current events, professional, industry, trade, or hobby information. Personalized news engine 230 can search, for example, network 105, news library 205, or data storage unit 135 to identify content associated with subscriber interests.

In one embodiment, at least some content associated with non-textual category data provided by a subscriber may be found in music library 210. For example, music library 210 may include audio content such as songs, spoken word, or other audio data. As is the case with news library 205, music library 210 can include a plurality of channels that may form at least part of a subscriber channel provided by channel personalization engine 140. For example, music library 210 can include at least one pre-programmed music channel 232. Pre-programmed music channel 232 may include a music channel dedicated to a particular artist, band, genre, category of music, spoken word, song, group of songs, or audio data. In one embodiment, at least one pre-programmed music channel can correspond to non-textual category data provided by a subscriber via at least one of first subscriber device 110 and second subscriber device 115. Music library 210 may also include at least one personalized music channel engine 235. In one embodiment, personalized music channel engine 235 can search for, retrieve, or aggregate content, such as audio files, associated with non-textual category data provided by a subscriber.

In one embodiment, advertising library 215 includes at least one ad insertion engine 240. Ad insertion engine 240 may insert at least one advertisement into a subscriber channel of channel personalization engine 140. Advertisements may be in any of a plurality of formats compatible for display on a plurality of devices. For example, ad insertion engine 240 may insert an advertisement as an audio file into content of personalized music channel engine 235. Continuing with this illustrative embodiment, personalized music channel engine 235 may provide streaming audio as part of a subscriber channel to, for example, first subscriber device 110 via channel personalization engine 140 and network 105. In this example, ad insertion engine 240 may select an advertisement in an audio format from advertising library 215 and provide it to channel personalization engine 140. Channel personalization engine 140 may then insert the advertisement into streaming audio generated by personalized music channel engine 235 or pre-programmed music channel 232.

In one embodiment, channel personalization engine 140 can insert an advertisement into content provided by news library 205 or music library 210, or their associated elements. Examples of advertisements include gateway or pre-roll advertisements, streaming commercials, subscriber channel sponsorships, web page advertisements and sponsorships, including a song, content, or web page with a subscriber channel, special event announcements, (e.g., album premiers or conferences), corporate subchannels associated with a subscriber channel, paid programming, infomercials, email sponsorships, e-commerce, and various promotions or promotional announcements.

With continued reference to FIG. 1 and FIG. 2, in one embodiment, a subscriber may join a service provided by server 130. The subscriber may or may not pay a fee to join this service. For example, the subscriber may interface with at least one of first subscriber device 110 and second subscriber device 115 to connect with server 130 via network 105. Logic associated with server 130 can prompt a subscriber to enter non-textual category data. An indication to this effect may appear on a display associated with at least one of first subscriber device 110 and second subscriber device 115. The non-textual category data entered by a subscriber may indicate types of audio data of interest to the subscriber. For example, non-textual category data may include data indicating that a subscriber likes a particular song, musician, artist, band, category, or genre of music. A subscriber may also indicate an interest in non-textual categories such as spoken word, poetry, foreign languages, or audio or video regarding a topic or category of interest to the subscriber.

A subscriber may enter subscriber interest category data by interfacing with at least one of first subscriber device 110 and second subscriber device 115, and the subscriber interest category data may indicate affinities of the subscriber. For example, a subscriber may provide data to server 130 indicative of the subscriber's interests, passions, affinities, hobbies, recreations, profession, professional activities or organizations, political, social, religious, or personal preferences. In one embodiment, the subscriber interest category data and the non-textual data entered by a subscriber can be mutually exclusive, although it is appreciated that this need not be the case. For example, a subscriber may provide to server 130, via a device associated with network 105, non-textual category data indicating the subscriber has an interest jazz music. The subscriber may also provide subscriber interest category data indicating that the subscriber has a passion for classic cars and an interest in the latest stock reports.

Continuing with this illustrative embodiment, server 130 can receive these subscriber selections and identify content associated with them. This content may be stored in data storage unit 135 or elsewhere throughout network 105. For example, content associated with the non-textual category data of jazz music may include songs performed by the jazz artist Louis Armstrong that are stored in data storage unit 135. In one embodiment, content associated with non-textual category data may include video content, such as music videos, or video associated with one or more categories. For example, a non-textual category may include skateboarding, and content associated with skateboarding may include video clips of people skateboarding in various locations at various times. Analogously, content associated with subscriber interest categories of classic cars and stock reports, such as a real-time stock listings and classic car online chat rooms, may be retrieved via network 105 from various sources.

In one embodiment, channel personalization engine 140 may create at least one subscriber channel that includes content associated with non-textual data categories, content associated with subscriber interest categories, combinations thereof as well as additional content, such as advertisements. Subscriber channels can provide content associated with a plurality of different categories in a plurality of different formats. For example, content associated with a non-textual category (e.g., Louis Armstrong music) can be provided in a streaming audio format, and content associated with a subscriber interest category (e.g., stock reports) can be provided in a visual format, such as a graph indicating performance of, for example, a particular stock or an entire stock market, over a period of time.

Channel personalization engine 140 may provide the subscriber channel to the subscriber. This can include content associated with the non-textual category, or the subscriber interest category. The subscriber channel may be provided via network 105 in a plurality of formats to a plurality of devices. For example, content associated with the non-textual category data can be provided to first subscriber device 110 in a first format, and content associated with the subscriber interest category data can be provided to second subscriber device 115 in a second format. In one embodiment, content associated with subscriber interest category data can be embedded within content associated with the non-textual category data in an audio or other format. In one embodiment, content associated with the non-textual category data and content associated with the subscriber interest category data can both be provided, in one or more formats, to one device, such as one of first subscriber device 110 and second subscriber 115.

In one embodiment, content can be provided substantially simultaneously to first subscriber device 110 and second subscriber device 115. For example, content provided to first subscriber device 110 may include streaming audio of content associated with non-textual category data, such as a jazz song or skateboarding video, and content provided to second subscriber device 115 may include stock report graphs for fortune 500 companies. In this example, substantially simultaneously providing the jazz song to first subscriber device 110 and the stock reports to second subscriber device 115 can include providing the stock reports to second subscriber device 115 while any portion of the jazz song is being provided to first subscriber device 110. It should be appreciated that this illustrative embodiment, where there is at least a partial overlap in time of content being provided in different formats to different devices is not limiting, as content may be provided in one format to one device and, subsequently, different content may be provided in a different format to a different device.

A plurality of users may also access the subscriber channel. In one embodiment, a user does not know the subscriber associated with the subscriber channel. For example, channel personalization engine 140 may receive user interest category data provided by a user. Channel personalization engine 140 can evaluate the user interest category data and determine if the subscriber channel is to be provided to the user. For example, based on similarities between user interest category data and subscriber interest category data, channel personalization engine 140 can determine that a user associated with the user interest category data would be interested in accessing or receiving the subscriber channel. In this example, the channel personalization engine can provide, to the user via the subscriber channel, the content associated with non-textual category data and the content associated with the user interest category data. Channel personalization engine 140 can provide a subscriber channel to a user in a plurality of formats that can be executed on a plurality of devices, such as at least one of first user device 120 and second user device 125, for example.

In one embodiment, the subscriber channel includes a plurality of subchannels. A subchannel may be dedicated to particular content, such as at least a portion of the content of non-textual or subscriber interest data. For example, a subchannel of the subscriber channel may provide stock listings in any format, such as audio, video, or a combination thereof. A subchannel may also be dedicated to a particular format. For example, a subchannel may provide streaming audio/visual data of any content, such as non-textual category content, (e.g., Louis Armstrong music) or subscriber interest category data content, (e.g., an audio/video compilation concerning a past or planned classic car show).

Figure 3:
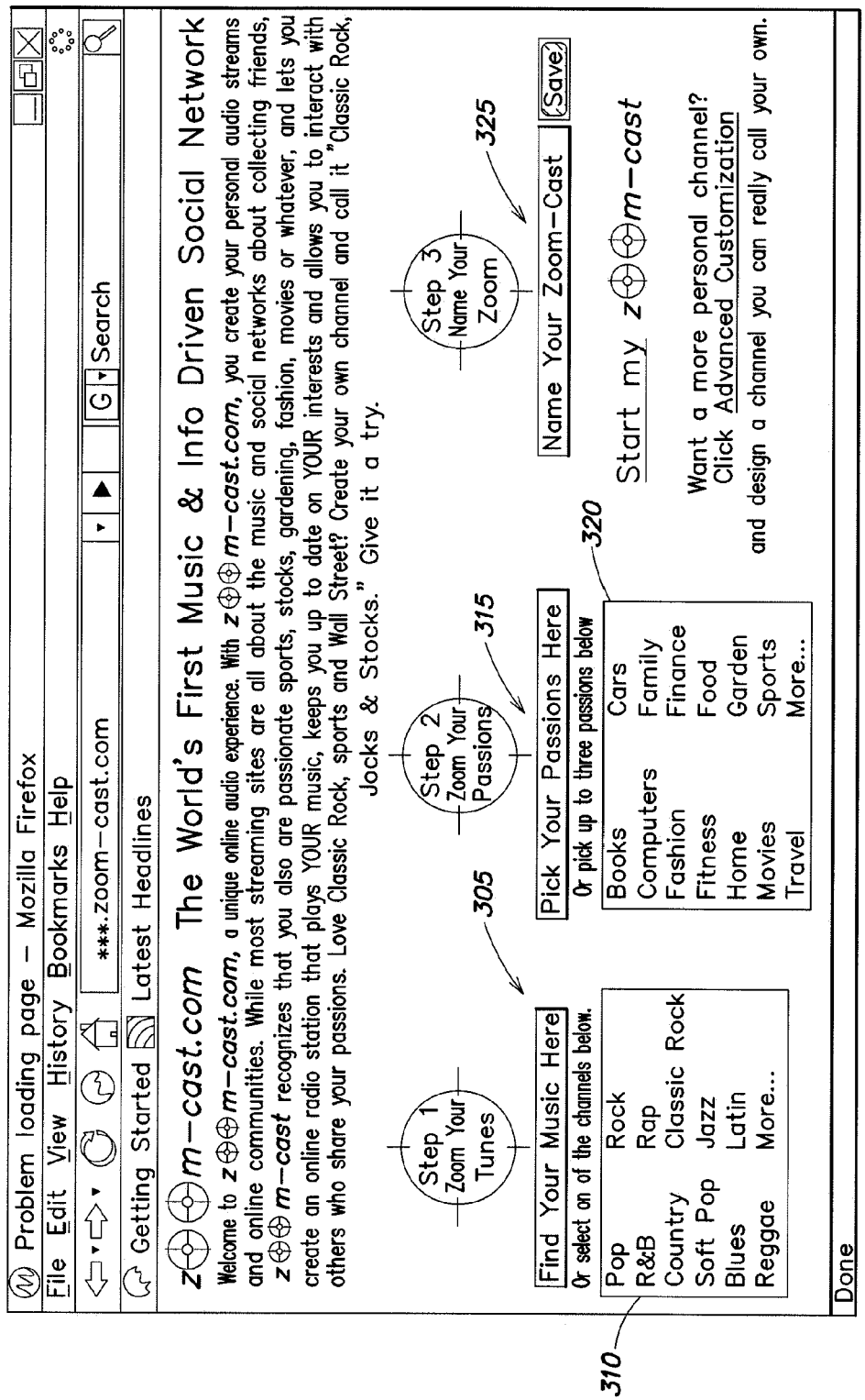
FIG. 3 is a screenshot depicting a subscriber channel in accordance with one embodiment of the invention.

In one embodiment, to create a subscriber channel, a subscriber can be presented with a screenshot, as depicted in FIG. 3. The screenshot of FIG. 3 may be displayed, for example on at least one of first subscriber device 110 and second subscriber device 115. As depicted in the exemplary screenshot of FIG. 3, at first interface 305 a subscriber may enter non-textual data categories such music genres of interest to a subscriber. At first interface 305 a subscriber may select from a list of preprogrammed channels, such as non-textual category list 310. In one embodiment, and with reference to FIGS. 2 and 3, content associated with categories such as Pop, Rock, and Rap displayed in non-textual category list 310 can be provided by pre-programmed music channels 232. A subscriber may also enter non-textual category content data that does not appear in non-textual category list 310, and content associated with any such customized non-textual categories may be identified or retrieved by personalized music channel engine 235.

As depicted in FIG. 3, a subscriber can enter a selection of subscriber interest category data into second interface 315. The subscriber interest category data may be custom subscriber category entries, or may be selected from a displayed subscriber interest category list 320, which can be provided by at least one of pre-programmed news channel 220 or company news channel 225. In one embodiment, selections from a subscriber that do not appear in subscriber interest category list 320 may be identified or retrieved by personalized news engine 230. In one embodiment, a subscriber may enter a name for his or her subscriber channel into at least one naming interface 325.

Figure 4:
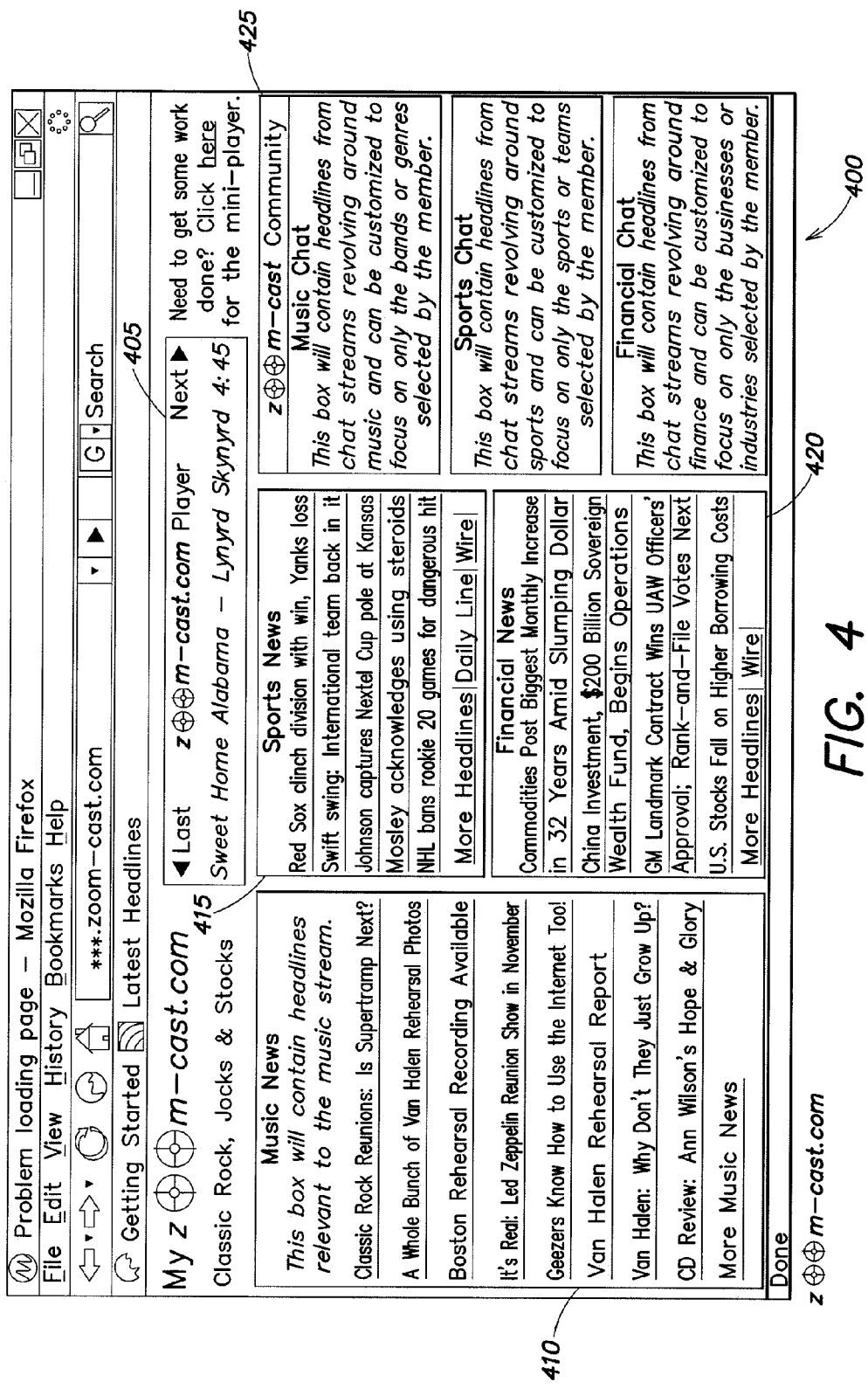
FIG. 4 is a screenshot depicting a subscriber channel in accordance with one embodiment of the invention.

FIG. 4 is a screenshot depicting a subscriber channel 400 in accordance with one embodiment of the invention. As illustrated in FIG. 4, subscriber channel 400 has been given the title, "Classic Rock, Jocks & Stocks" as entered by a subscriber due to a subscriber interest in a non-textual category of classic rock, and subscriber passion for interest categories of sports and stocks. It is appreciated that this example is illustrative and that different subscriber channels can have different names, different non-textual categories, and different subscriber interest categories. Subscriber channel 400 includes at least one non-textual display 405. In one embodiment, non-textual display 405 includes an audio display that can play, in an audio format, content associated with non-textual category data. In one embodiment, subscriber channel 400 may provide subscriber interest category data for display in at least one of first subscriber interest display 410, second subscriber interest display 415, and third subscriber interest display 420. As illustrated in the embodiment of FIG. 4, first subscriber interest display 410 may include content provided by music library 210, and second and third subscriber interest displays 415 and 420 may include content provided by news library 205, although it should appreciated that other configurations are possible and that content from advertising library 215 may appear in any of non-textual display 405, first, second, and third subscriber interest displays 410, 415, and 420.

In one embodiment, first subscriber interest display includes content relevant to non-textual category content that can be displayed in non-textual display 405. For example, if non-textual display 405 is providing data in one format, such as streaming audio of classic rock music, (e.g., music from the band Lynyrd Skynrd), first subscriber interest display 410 can provide data related to classic rock music (e.g., information about a Led Zeppelin reunion) in a second format, such as a text or visual format. In one embodiment, any of first subscriber interest display 410, second subscriber interest display 415, and third subscriber interest display 420 can display content in one format, while non-textual display 405 displays content in another format.

With continued reference to FIG. 4, a subscriber channel such as subscriber channel 400 may display at least one community interface 425. In one embodiment, community interface 425 includes chat streams and other textual, audio, or video displays of content provided by other users of subscriber channel 400. For example, when subscriber channel 400 is generated responsive to subscriber interest category data that indicative of a subscriber interest in stock prices, community interface 425 may include or be associated with a chat room dedicated at least in part to the state of various financial markets. In one embodiment, channel personalization engine 140 identifies a plurality of users that have indicated an interest in financial or stock information, and aggregates these users together with the subscriber in a chat room associated with community interface 425.

Figure 5:
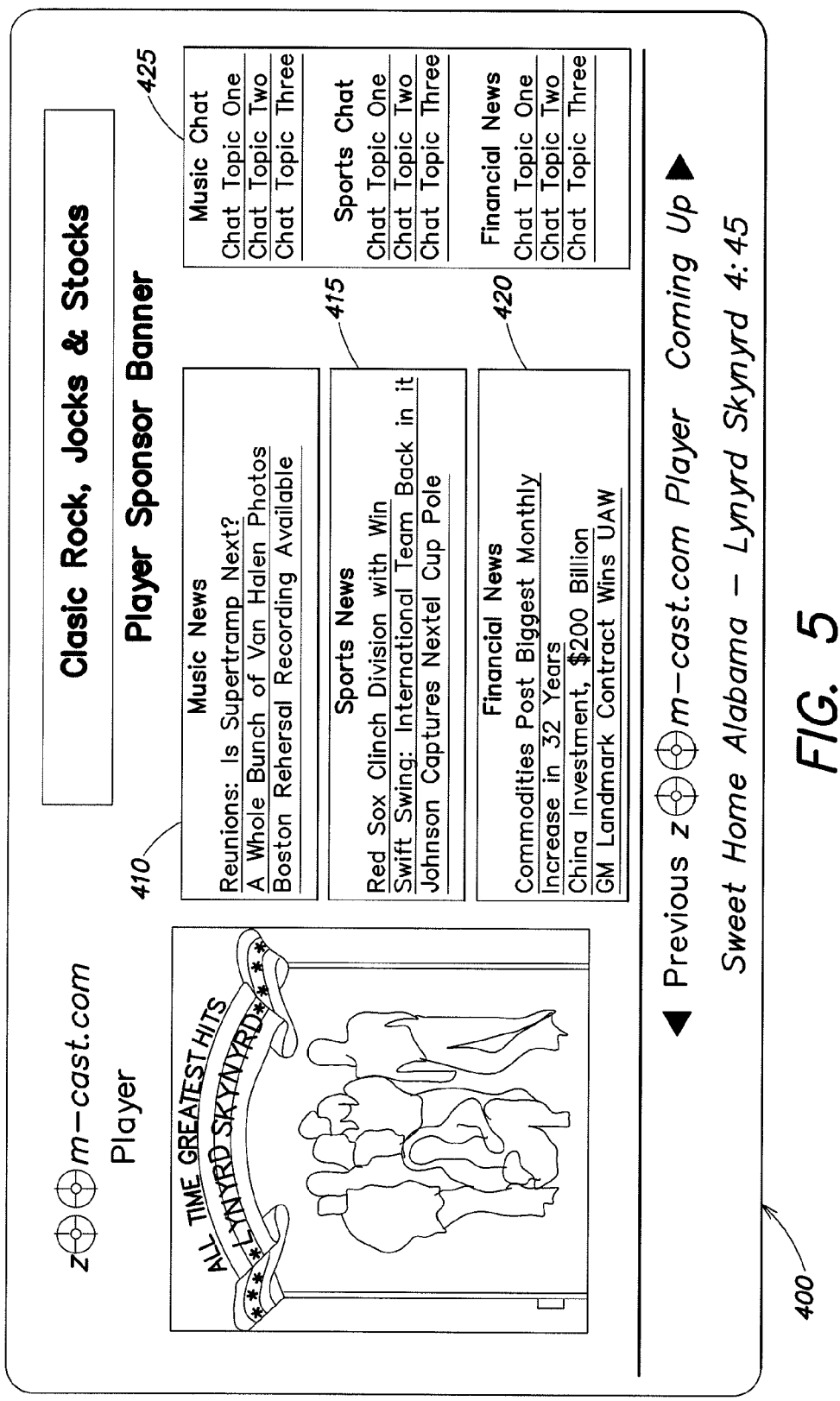
FIG. 5 is an illustration of a display of a subscriber channel on a device in accordance with one embodiment of the invention.

FIG. 5 is an illustration of a display of subscriber channel 400 on a device in accordance with one embodiment of the invention. In one embodiment, subscriber channel 400 can be displayed in a first format on a device, such as any of first subscriber device 110, second subscriber device 115, first user device 120, or second user device 125. As illustrated in FIG. 5, content may be displayed in multiple formats on at least one device. For example, streaming audio of content associated with a non-textual category (e.g. a classic rock song) may be played substantially simultaneously with links to content associated with subscriber interest category data. Users in addition to the subscriber may also access a subscriber channel and any associated content, and users may also provide content via community interface 425 or other forums. In one embodiment, and as illustrated in FIG. 5, further content associated with non-textual categories may also be provided. For example, when a non-textual data category includes a genre of music such as classic rock, content associated with the non-textual data category may include audio of that song as well as, for example, an album cover or other associated data, facts, or information.

In one embodiment, channel personalization engine 140 generates a custom subscriber channel responsive to subscriber input. The subscriber channel can provide streaming audio through network 105 to a plurality of subscriber and client devices. The streaming audio can include music or other audio such as sports talk in which a subscriber has indicated an interest. Channel personalization engine 140 may also provide additional audio data. For example, if a subscriber indicates an interest in jazz, the subscriber channel may provide streaming audio that includes jazz songs, as well as additional streaming audio. The additional streaming audio may include music from a different genre, such as blues, as well as additional data, such as advertisements on various topics. In one embodiment, advertisements can relate to subscriber interests. For example, when a subscriber channel provides streaming audio of content associated with a non-textual data category (e.g. jazz music), an advertisement for an upcoming jazz concert may be included in the streaming audio, although it is appreciated that advertisements need not relate to subscriber interests.

Concurrent with streaming audio, a subscriber channel generated by channel personalization engine 140 can also provide content associated with subscriber interest category data. In one embodiment, content associated with subscriber interest categories can be different from content associated with non-textual category data. For example, non-textual category content can include music preferred by a subscriber and subscriber interest content can include information about a subscriber's hobbies, professional activities, interests, or associations. In one embodiment, a subscriber channel provides content from both of these categories substantially simultaneously. For example, subscriber channel may provide streaming audio including non-textual category content and, during the streaming audio transmission, may also provide subscriber interest category content.

In one embodiment, the non-textual category content and the subscriber interest category content can be provided in different formats. For example, non-textual category content may be provided as streaming audio, and the subscriber interest category content may be provided as one or more of links to a web page, text, or video clips. In this illustrative embodiment, a subscriber can receive streaming audio including non-textual category content and at the same time can read, view, or listen to subscriber interest category content. For example, a subscriber can listen to his or her preferred music, and at the same time can read articles that include content directed toward the subscriber's other, (e.g., non-musical) interests or activities.

In various embodiments, the non-textual category content and the subscriber interest category content can be provided in different formats for execution on a same device or on different devices. For example, non-textual category content may be provided as streaming audio that is executed (i.e., played) on a portable music player associated with network 105. In one embodiment, a portable music player may interface with network 105 and download non-textual category content for subsequent execution. In this exemplary embodiment, a computer may interface with network 105 to receive subscriber interest category content. For example, channel personalization engine 140 may generate a subscriber channel. The subscriber channel may provide non-textual category content in a first format (e.g., streaming audio) to first subscriber device 110, and may also provide subscriber interest category content in a second format (e.g., a visual format) to second subscriber device 115. It should be appreciated that any subscriber channel content may be provided to at least one of first subscriber device 110, second subscriber device 115, first user device 120, and second user device 125, as well as any additional devices that can interface with network 105.

In one embodiment, a plurality of users can join the service offered by server 130. For example, server 130 can receive a selection of user interest category data or user non-textual category data. Channel personalization engine 140 can evaluate this data and determine if a user associated with this data may be interested in the content of a subscriber channel. When channel personalization engine 140 determines that a user may be interested, that user may be provided access to the subscriber channel that was created by a subscriber, or in response to information provided by a subscriber. For example, channel personalization engine 140 may create a subscriber channel. The subscriber channel may include non-textual category content associated with, for example, modern rock music and subscriber interest category content associated with a particular trade, such as carpentry. Channel personalization engine 140 may also receive data from a plurality of users. At least one of the plurality of users can provide data indicating an interest in carpentry, or something similar, like construction or architecture. Based at least in part on this information, channel personalization engine 140 may determine that this user may be interested in the subscriber channel. In this example, channel personalization engine 140 can provide at least part of the subscriber channel (e.g., one or more subchannels) to the user via network 105. In this example, a user may access at least a portion of the subscriber channel on at least one of first user device 120 and second user device 125.

In one embodiment, channel personalization engine provides the entire subscriber channel to a user. In an alternate embodiment, only a portion of the subscriber channel, such as a subchannel that includes content deemed to be of interest to the user is provided to the user. A subscriber associated with the subscriber channel may, but need not, be aware that one or more users have been granted access to the subscriber channel. For example, a subscriber channel may be provided concurrently to the subscriber and to a plurality of users. Different subchannels of the subscriber channel, (e.g., a subchannel) that provides at least some non-textual category content, or a subchannel that provides at least some subscriber interest category content may be provided concurrently or in succession to a plurality of devices via network 105. In one embodiment, a plurality of users can concurrently access a subscriber channel or any subchannels thereof in any format such as streaming audio of non-textual content, or links to web pages including subscriber interest category content. For example, a user who is a blacksmith who likes classical music may access subscriber channels associated with other blacksmiths, other classical music aficionados, or other blacksmiths who also enjoy classical music. In one embodiment, channel personalization engine 140 prompts a subscriber for authorization to allow one or more users to access the subscriber channel.

In one embodiment, a subscriber channel forms the basis of a social network. For example, a subscriber and a plurality of users may access at least part of a subscriber channel via any device such as at least one of first subscriber device 110, second subscriber device 115, first user device 120, second user device 125, and other devices configured to interface with network 105. Channel personalization engine 140 may evaluate user interests or other data associated with users to determine that the users may have an interest in a particular subscriber channel. These users may then access the subscriber channel. It should be appreciated that this form of social networking does not require any affirmative action by a subscriber associated with the subscriber channel after the subscriber channel has been generated. A social network may form around a subscriber channel based on interest categories (e.g., personal passions or industry affiliations) of subscribers and users. The subscriber and the users need not be aware of each others existence prior to a determination by channel personalization engine 140 that a user may be interested in a subscriber channel. In one embodiment, social networks can also form around at least one pre-programmed news channel 220 or pre-programmed music channel 232, or a subscriber channel that includes at least one of these pre-programmed channels. As described herein, when a user accesses a subscriber channel associated with a subscriber, the user and the subscriber are linked and become members of a social network. In one embodiment, a subscriber can invite a user to join a social network associated with the subscriber channel.

In one embodiment, advertisements can be directed to members of social networks associated with subscriber channels. With respect to the above illustrated example, a social network may form around a subscriber channel whose members have interests associated with the blacksmith trade, and who have indicated a preference for classical music. With reference to FIG. 2, ad insertion engine 240 may provide advertisements that are included in the subscriber channel for distribution to members of the social network associated with the subscriber channel. Due to the nature of the members of the social network, (e.g., classical music loving blacksmiths) in one embodiment the advertisements carried in the subscriber channel may be focused to perceived areas of interest of the members of the social network. For example, a blacksmith union may advertise a forthcoming rally, meeting, or membership drive. Another advertisement, for example selected from advertisement library 215 and provided to the subscriber channel by ad insertion engine 240, may include offers for sale of a classical music artist whose songs may also be provided by the subscriber channel as content associated with non-textual category data provided by the subscriber. With reference to FIG. 4, members of a social network may also form community chat strings via community interface 425 regarding any topic, and these chat strings may form part of the subscriber channel. In one embodiment, channel personalization engine 140 may designate or permit one user or subscriber to act as a moderator or leader of a social network or any chat strings included therein.

Figure 6:
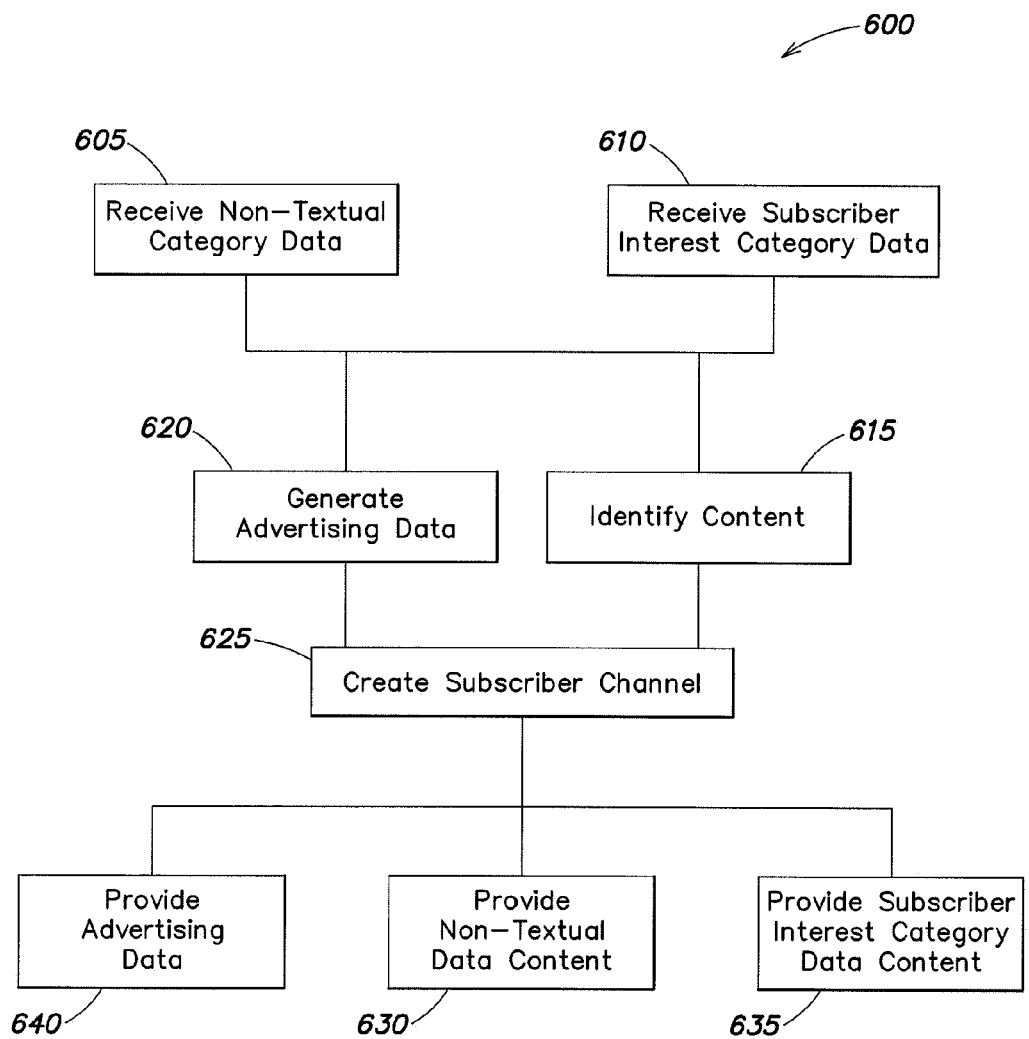
FIG. 6 is a flow chart depicting a computer implemented method for managing electronically delivered information channels in accordance with an embodiment of the invention.

FIG. 6 is a flow chart depicting a computer implemented method 600 for managing electronically delivered information channels in accordance with an embodiment of the invention. Method 600 may include the act of receiving a selection of non-textual category data (ACT 605). Receiving non-textual category data (ACT 605) may include receiving non-textual category data from a subscriber. For example, a subscriber may enter non-textual category data into a device for transmission through a network to a server, where non-textual category data can be received (ACT 605). In one embodiment, receiving non-textual category data (ACT 605) includes receiving an indication of non-textual categories of data preferred by a subscriber. For example, receiving non-textual category data (ACT 605) may include receiving an indication that a subscriber has in interest in various musical genres, artists, or songs, as well as spoken word, sports talk, or news.

In one embodiment, computer implemented method 600 may also include an act of receiving a selection of a plurality of subscriber interest category data (ACT 610). In one embodiment, subscriber interest category data can be received (ACT 610) from a subscriber via a network. For example, receiving subscriber interest category data (ACT 610) can include receiving information indicative of activities, passions, hobbies, or interests of a subscriber.

Computer implemented method 600 may also identify content associated with at least one of the non-textual category data and the subscriber interest category data (ACT 615). For example, responsive to receiving a selection of non-textual category data (ACT 605) indicating that a subscriber enjoys alternative rock music, computer implemented method 600 can identify content associated with alternative rock music (ACT 615), such as alternative rock songs, songs by a particular alternative rock artist, band, or group, audio interviews with alternative rock artists or people in the alternative rock industry, reviews of alternative rock songs, or audio data advertising alternative rock songs, artists, paraphernalia, musical equipment, or events. The act of identifying content (ACT 615) may also include retrieving the content or making it available for transmission as part of a subscriber channel.

Identifying content (ACT 615) can also include identifying content associated with subscriber interest category data. For example, when a subscriber interest category is classic cars, identifying subscriber interest category content (ACT 615) can include identifying past or scheduled classic car shows, identifying links to web pages reviewing or discussing classic cars, identifying video content associated with classic cars, or identifying sale listings of classic cars, other classic car enthusiasts, or advertisements associated with classic cars or related services such as classic car rentals.

Identifying content associated with non-textual or subscriber interest categories (ACT 615) can include identifying content in any medium configured for transmission in a network, and can include identifying content for display or execution on a plurality of devices in a plurality of formats. For example, identifying content (ACT 615) can include identifying content in various combinations of audio, visual, and textual formats that can be displayed on a variety of devices, such as portable music players, computers, personal digital assistants, mobile telephones, and other display devices. Identifying content (ACT 615) may also include identifying or receiving content from databases, libraries, data storage units, computers, or servers associated with a network.

In one embodiment, computer implemented method 600 includes an act of generating advertising data (ACT 620). For example, generating advertising data (ACT 620) may include retrieving advertisements data from a database or library and providing them to a subscriber channel or any subchannel thereof. Generating advertising data (ACT 620) can, but need not, include generating or providing advertisements directed to one or more identified non-textual or subscriber interest categories. For example, when a subscriber interest category includes classic cars, generating advertisement data (ACT 620) may include retrieving or providing an advertisement related to classic car repair, sales, or events.

Computer implemented method 600 can also include the act of creating at least one subscriber channel (ACT 625). In one embodiment, creating a subscriber channel (ACT 625) includes aggregating content identified in identifying act (ACT 615) and advertising generated by generating act (ACT 620). For example, creating a subscriber channel (ACT 625) can include creating a subscriber channel that provides, to at least one of a subscriber and a plurality of clients, any combination of content associated with non-textual categories, content associated with subscriber interest categories, and advertisements, among other information or data such as online community chat rooms or bulletin boards.

Creating a subscriber channel (ACT 625) may include acts of creating a plurality of subchannels, where the subchannels may provide data in at least one format for display on or execution by at least one device. Creating a subscriber channel (ACT 625) may include creating a subscriber channel having subchannels where at least one subchannel is associated with content of one or more categories. Creating a subscriber channel (ACT 625) can include providing a subchannel at least partially responsive to a received non-textual category data selection (ACT 605) and a received subscriber interest category data selection (ACT 610). In one embodiment, creating a subchannel (ACT 625) includes creating a subchannel responsive at least in part to the receipt of a fee paid by a subscriber.

In one embodiment, computer implemented method includes an act of providing non-textual data content (ACT 630). Providing non-textual data content (ACT 630) may include providing streaming audio of content such as songs by artists, or bands associated with non-textual category data received from a subscriber. For example, providing non-textual data content (ACT 630) may include providing content identified in identifying act (ACT 615). Non-textual data content can be provided (ACT 630) in a plurality of formats. For example, providing non-textual data content (ACT 630) may include providing audio files or streaming audio. Providing non-textual data content (ACT 630) may also include providing video or text files associated with content. For example, a non-textual category can include piano music. It should be appreciated that music is non-textual, and that providing non-textual data content (ACT 630) can include providing associated textual content such as a biography of a pianist or a link to a webpage of a piano maker, as well as audio files or streaming audio of music played on a piano.

Providing non-textual data content (ACT 630) may also include providing content associated with a non-textual data category through a network for display or execution on a device in any format compatible with that device. In one embodiment, providing non-textual data content (ACT 630) includes providing non-textual data category content to a plurality of devices for display in a plurality of different formats. For example, the same non-textual data category content can be provided to a plurality of devices. Alternatively, some non-textual data category content can be provided to a device, and different non-textual data category content can be provided to another device. In various embodiments, the non-textual data category content may be provided (ACT 630) in the same or different formats to one or more devices at the same time, substantially the same time, consecutively, or at different times. In one embodiment, providing non-textual data content (ACT 630) includes providing non-textual data content to at least one of a subscriber and one or more users.

Computer implemented method 600 may also include an act of providing subscriber interest category data content (ACT 635). In one embodiment, providing subscriber interest category data content (ACT 635) occurs at a time that can be concurrent with, subsequent, or substantially simultaneous to, or different than a time during which the act of providing non-textual data content (ACT 630) occurs. Providing subscriber interest category data content (ACT 635) can include providing content identified by identifying act (ACT 615) and received by receiving act (ACT 610) that is associated with interests of a subscriber. These interests can include subscriber hobbies, professions, or activities, among other subscriber pursuits or interests.

In one embodiment, providing non-textual data content (ACT 630) can include providing any of a song, an audio broadcast associated with the song, and an audio advertisement for the song. In this illustrative embodiment, computer implemented method 600 can also include providing subscriber interest category data content (ACT 635) that includes, for example, a video of an artist singing a song provided by non-textual content providing act (ACT 630). In this illustrative embodiment, providing non-textual data content (ACT 630) that includes a song, can occur substantially simultaneously with an act of providing subscriber interest category data content (ACT 635) that includes video of an artist singing the song. In this example, an audio recording of the song may be provided (ACT 630) to one device in an audio format, and a video of an artist singing the song may be provided to the same or a different device in a video or audio/video format.

Providing subscriber interest category data content (ACT 635) can include providing content through a network in a plurality of formats, through a plurality of subchannels, for display on or execution by a plurality of devices. Different subscriber interest category data content can be provided (ACT 635) to different devices in one or more formats. Alternatively, and the same subscriber interest category data content can be provided (ACT 635) to one or more devices in one or more formats. In one embodiment, providing subscriber interest category data content (ACT 635) includes providing non-textual data content (ACT 630) to at least one of a subscriber and a one or more users. Providing content associated with subscriber interest category data (ACT 635) can include providing this content to a web page for display on a device.

Computer implemented method 600 may also include an act of providing advertising data (ACT 640). Providing advertisement data (ACT 640) can include providing a subscriber channel that includes at least one advertisement. This act of providing an advertisement (ACT 640) may include providing an advertisement associated with at least one of a non-textual category and a subscriber interest category. Providing an advertisement (ACT 640) can include providing an advertisement to one or more of a subscriber and a user via a network. An advertisement may be provided (ACT 640) in any format (e.g., streaming audio, audio, text, or video, among others) configured for display or execution on a device adapted to interface with the network. Providing an advertisement (ACT 640) may also include providing a plurality of advertisements in one or more formats to one or more devices. For example, an advertisement may be provided (ACT 640) in an audio format to a portable music player device, and as a link to a web page to be displayed on a computer. In one embodiment, computer implemented method 600 provides at least one advertisement (ACT 640) embedded into an audio file or streaming audio transmission that includes content associated with a non-textual category. In one embodiment, advertising data can be generated and provided (ACT 640) in response to an evaluation of non-textual category data and subscriber interest category data.

In one embodiment, providing non-textual data content (ACT 630), providing subscriber interest category data content (ACT 635) and providing advertising data (ACT 640) can occur at substantially the same time in one or more formats. It should be appreciated that providing a subscriber channel to at least one of a subscriber and one or more users can include any combination of providing non-textual data content (ACT 630), providing subscriber interest category data content (ACT 635) and providing advertising data (ACT 640). For example computer implemented method 600 can identify formats compatible with a device, and can provide a subchannel of the subscriber channel (e.g. a portion of the subscriber channel including at least some non-textual or subscriber interest content) to the device in one of the compatible formats. In one embodiment, providing non-textual data content (ACT 630) includes providing at least some non-textual data content to one or more users in a first format, and providing subscriber interest category data content (ACT 635) includes providing at least some subscriber interest category data content to one or more users in a second format.

Figure 7:
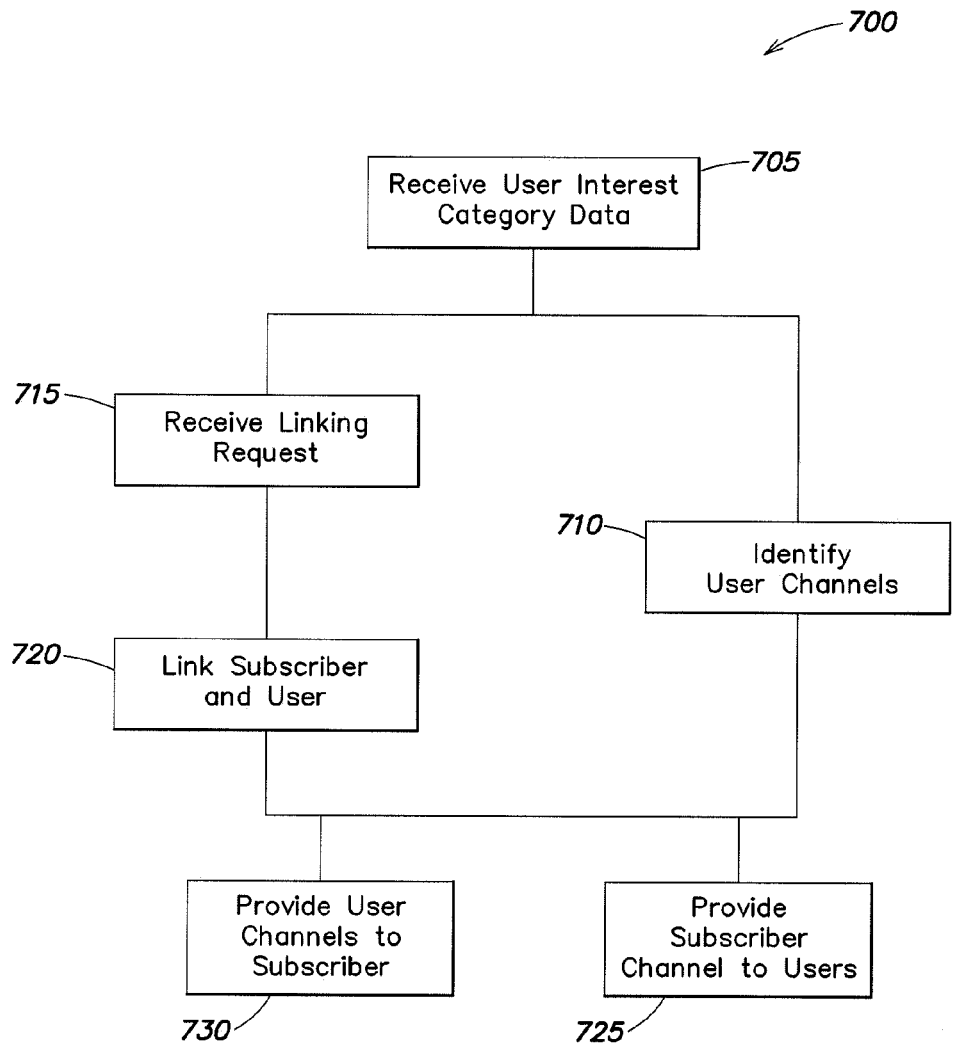
FIG. 7 is a flow chart depicting a computer implemented method for managing electronically delivered information channels in accordance with an embodiment of the invention.

FIG. 7 is a flow chart depicting a computer implemented method 700 for managing electronically delivered information channels in accordance with an embodiment of the invention. Method 700 may include an act of receiving user interest category data (ACT 705). In one embodiment, receiving user interest category data includes receiving data from a user in the process of creating a user channel. Receiving user interest category data (ACT 705) may include receiving user interest category data from a user. For example, a user may enter data indicative of the user's interests into a device for transmission through a network to a server, where it can be received (ACT 705). In one embodiment, receiving user interest category data (ACT 705) includes receiving information indicative of activities, passions, hobbies, or interests of a user.

Computer implemented method 700 may include an act of identifying at least one user channel (ACT 710). In one embodiment, a user channel may be identified at least in part in response to received user interest category data (ACT 705). A user channel can include a channel, associated with a user, that can provide non-textual and user interest content to one or more users. In one embodiment, identifying user channels (ACT 710) includes identifying user channels custom created for a user responsive to information provided by a user.

In one embodiment, computer implemented method may include an act of receiving a linking request (ACT 715). Receiving a linking request (ACT 715) can include receiving a request from a user to link to a subscriber channel as well as a request from a subscriber to link to a user channel. In one embodiment, computer implemented method 700 generates a linking request based on an evaluation of user interest category data and provides a linking request for display on a device together with a subscriber channel or a user channel. In one embodiment, receiving a linking request (ACT 715) includes receiving a request by a user to access a subscriber channel, receiving a request by a subscriber to access a user channel, or receiving a request by one user to access a user channel of another user.

Computer implemented method 700 may also include an act of linking a subscriber and a user (ACT 720). Linking a subscriber and a user (ACT 720) can include forming a social network between the subscriber and the user. Linking a subscriber and a user (ACT 720) can also include providing access to a subscriber channel or a user channel so that the contents of the channel may be accessed by a plurality of subscribers or users. For example, linking a subscriber and a user (ACT 720) includes enabling a user, (via a device connected to a network) to access a subscriber channel, with or without the subscriber's knowledge or consent. Although access to a channel of another need not be bi-directional, in one embodiment, linking a subscriber and a user (ACT 720) allows a subscriber to access a user channel.

Linking a subscriber and a user (ACT 720) may, but need not, be responsive to a received linking request (ACT 715). For example, linking a subscriber and a user (ACT 720) may occur in the absence of a request responsive to an evaluation or analysis of subscriber interest category data and user interest category data. In this example, an at least partial overlap in subscriber and user interest category data or associated content can cause computer implemented method 700 to link a subscriber and a user (ACT 720).

In one embodiment, computer implemented method 700 includes an act of providing at least one subscriber channel to at least one user (ACT 725). Providing a subscriber channel to a user (ACT 725) may be responsive to the act of linking a subscriber and a user (ACT 720). Providing a subscriber channel to a user may include providing at least one subchannel of a subscriber channel, via a network, to a device associated with a user. For example, at least a portion of a subscriber channel, such as streaming audio content associated with non-textual category data selected by the subscriber, may be transmitted through a network to a user's portable music device. In one embodiment, a user may provide additional content, such as chat room strings, that can form part of the subscriber channel. In one embodiment, providing a subscriber channel to a user (ACT 725) can be responsive to an act of receiving user interest category data (ACT 705). For example, user interest category data may be received (ACT 705) and evaluated, and a subscriber channel may be provided to the user (ACT 725) responsive to this evaluation.

Computer implemented method 700 may also include an act of providing at least one user channel to a subscriber (ACT 730). Providing a user channel to a subscriber (ACT 730) may be responsive to the linking of a subscriber and a user (ACT 720). Providing a user channel to a subscriber (ACT 730) generally allows a subscriber access to at least a portion (e.g., subchannel) of a user channel on a device associated with a network. In one embodiment, providing a user channel to a subscriber (ACT 730) includes providing a user channel to another user.

Note that in FIGS. 1 through 7, the enumerated items are shown as individual elements. In actual implementations of the systems and methods described herein, however, they may be inseparable components of other electronic devices such as a digital computer. Thus, actions described above may be implemented at least in part in software that may be embodied in an article of manufacture that includes a program storage medium. The program storage medium includes data signals embodied in one or more of a carrier wave, a computer disk (magnetic, or optical (e.g., CD or DVD, or both), non-volatile memory, tape, a system memory, and a computer hard drive.

From the foregoing, it will be appreciated that the systems and methods described herein afford a simple and effective way to manage electronically delivered information channels. Customized subscriber channels can encompass a variety of diverse interests, musical tastes, activities and hobbies in different mediums and formats. The subscriber channels can be shared with others, and can be provided to a subscriber or users in a plurality of formats for display or execution by a plurality of devices. Users and subscribers having similar interests or hobbies can form a social network.

Any references to front and back, left and right, top and bottom, and upper and lower are intended for convenience of description, not to limit the present systems and methods or their components to any one positional or spatial orientation.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements.

Any embodiment disclosed herein may be combined with any other embodiment, and references to "an embodiment", "some embodiments", "an alternate embodiment", "various embodiments", "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Any embodiment may be combined with any other embodiment in any manner consistent with the objects, aims, and needs disclosed herein.

References to "or" may be construed as inclusive so that any terms described using "or" may indicate any of a single, more than one, and all of the described terms.

Where technical features in the drawings, detailed description or any claim are followed by references signs, the reference signs have been included for the sole purpose of increasing the intelligibility of the drawings, detailed description, and claims. Accordingly, neither the reference signs nor their absence have any limiting effect on the scope of any claim elements.

One skilled in the art will realize the systems and methods described herein may be embodied in other specific forms without departing from the spirit or essential characteristics thereof. For example, it should be appreciated that visual and audio displays of a subscriber channel vary based on the formats of the subscriber channel and the devices with which the subscriber channel is displayed or its files executed. For example, a computer may implement a visual or audio/visual display that incorporates links to web pages, text, audio and video. A portable music player may include an audio display, and may execute audio files or play streaming audio data. It should be appreciated that there can be any number of devices that can execute or display at least some subchannels of subscriber channels. The foregoing embodiments are therefore to be considered in all respects illustrative rather than limiting of the described systems and methods. Scope of the systems and methods described herein is thus indicated by the appended claims, rather than the foregoing description, and all changes that come within the meaning and range of equivalency of the claims are therefore intended to be embraced therein.

What is claimed is:

1. A computer implemented method for managing electronically delivered information channels, comprising:

receiving, by a computing device having a channel personalization engine, from one of a first subscriber device associated with a subscriber and a second subscriber device associated with the subscriber, via a computer network and internet connection, a selection of non-textual category data entered by the subscriber via an interface of one of the first subscriber device and the second subscriber device, and a plurality of subscriber interest category data entered by the subscriber via the interface of one of the first subscriber device and the second subscriber device;

identifying content associated with the non-textual category data and content associated with the subscriber interest category data;

creating, by the channel personalization engine, a subscriber channel associated with the subscriber and configured to stream at least a portion of the content associated with the non-textual category data to the subscriber via the computer network and internet connection, and the subscriber channel configured to stream at least a portion of the content associated with the subscriber interest category data to the subscriber via the computer network and internet connection to at least one of the first subscriber device and the second subscriber device, the subscriber channel including the content associated with the non-textual category data and including the content associated with the subscriber interest category data, wherein the subscriber channel is a customized subscriber channel of the subscriber created by the channel personalization engine at least in part responsive to the non-textual category data entered by the subscriber and the plurality of subscriber interest category data entered by the subscriber;

streaming, through the subscriber channel from the channel personalization engine via the computer network and internet connection to the first subscriber device, the portion of the content associated with the non-textual category data to the subscriber in a first format configured for display on the first subscriber device;

streaming, through the subscriber channel from the channel personalization engine to the second subscriber device, the portion of the content associated with the subscriber interest category data to the subscriber in a second format configured for display on the second subscriber device during a time period of continuous transmission of the content associated with the non-textual category data from the channel personalization engine to the subscriber in the first format configured for display on the first subscriber device;

receiving, by the channel personalization engine via the computer network and internet connection from a first user device, data entered into an interface of the first user device including at least one of second non-textual category data and user interest category data, wherein the first user device is a different device than the first subscriber device and the second subscriber device;

determining, by the channel personalization engine, that a first user associated with the first user device has an interest in a portion of content of the subscriber channel, the determining at least in part responsive to the non-textual category data and the user interest category data entered by the first user via the first user device;

streaming the portion of content of the subscriber channel to the first user via the first user device; and restricting the first user device's access of the subscriber channel to the portion of the content of the subscriber channel in which the first user associated with the first user device is determined to have the interest.

2. The computer implemented method of claim 1, wherein the subscriber channel comprises a plurality of subchannels, comprising:

identifying a plurality of formats compatible with the first subscriber device; and providing one of the subchannels to the first subscriber device in the first format, wherein the first format is selected from one of the plurality of formats.

3. The computer implemented method of claim 1, comprising:

providing, through the subscriber channel, the content associated with the non-textual category data to a plurality of users in the first format; and providing, through the subscriber channel, the content associated with the subscriber interest category data to the plurality of users in the second format.

4. The computer implemented method of claim 3, wherein the content associated with the non-textual category data includes an audio data file, further comprising:
   executing the audio data file on the first subscriber device.

5. The computer implemented method of claim 4, comprising:
   providing, through the subscriber channel, the content associated with the subscriber interest category data to the subscriber and to the plurality of users in the first format; and
   embedding the content associated with the subscriber interest category data within the audio data file.

6. The computer implemented method of claim 4, wherein the content associated with the subscriber interest category data is provided to a webpage, further comprising:
   displaying the webpage on the second subscriber device.

7. The computer implemented method of claim 1, wherein identifying content associated with the non-textual category data and content associated with the subscriber interest category data comprises:
   receiving the content associated with the selection of non-textual category data and the content associated with the subscriber interest category data from at least one database.

8. The computer implemented method of claim 1, comprising:
   receiving, from a plurality of users, a plurality of user interest category data; and
   providing, to one of the plurality of users, the content associated with the non-textual category data responsive to an evaluation of the subscriber interest category data and the user interest category data.

9. The computer implemented method of claim 8, comprising:
   linking, in a social network, the subscriber and at least one of the plurality of users.

10. The computer implemented method of claim 9, comprising:
    identifying a plurality of user channels, each associated with one of the plurality of users; and
    providing at least one of the plurality of user channels to the subscriber.

11. The computer implemented method of claim 10, comprising:
    receiving a request to link the subscriber with a user associated with at least one of the user channels.

12. The computer implemented method of claim 1, wherein receiving the selection of non-textual category data comprises receiving data identifying at least one of a music genre, an artist, a video, and a song, and wherein receiving the selection of the subscriber interest category data comprises receiving data identifying at least one of a news category, a sports category, an entertainment category, a current event category, a professional interest, and a hobby.

13. The computer implemented method of claim 12, comprising:
    evaluating the selection of non-textual category data and the subscriber interest category data to generate advertising data; and
    providing an advertisement to at least one of the subscriber and the plurality of users based at least in part on the advertising data.

14. The computer implemented method of claim 1, wherein:
    providing the content associated with the non-textual category data further comprises:
       providing at least one of a song, an audio news broadcast associated with the song, and an audio advertisement associated with the song; and wherein
    providing the content associated with the subscriber interest category data further comprises:
       providing at least one of a video of an artist singing the song, text of lyrics of the song, and a video advertisement.

15. The computer implemented method of claim 1, comprising:
    providing an advertisement to at least one of the first subscriber device and the second subscriber device, wherein the first format includes an audio format and wherein the second format includes at least one of a text format and a video format.

16. The computer implemented method of claim 1, wherein receiving the selection of non-textual category data and the subscriber interest category data, identifying content associated with the non-textual category data and content associated with the subscriber interest category data, creating the subscriber channel, providing the content associated with the non-textual category data, and providing the content associated with the subscriber interest category data are performed at least in part by at least one processor, and wherein the method is implemented at least in part in a program stored in a computer readable medium and executed by one or more of the at least one processors.

17. The computer implemented method of claim 1, comprising:
    simultaneously providing content of the subscriber channel to the subscriber via at least one of the first subscriber device and the second subscriber device, and to a user different than the subscriber via at least one user device.

18. In a computer network, a channel personalization engine, comprising:
    a non-transitory tangible data storage unit configured to store non-textual category data received by the data storage unit via the computer network and an internet connection from one of a first subscriber device and a second subscriber device each associated with a subscriber, the non-textual category data entered via an interface of at least one of the first subscriber device and the second subscriber device; and
    the data storage unit configured to store subscriber interest category data received via the computer network and internet connection from one of the first subscriber device and the second subscriber device each associated with the subscriber, the subscriber interest category data entered via the interface of at least one of the first subscriber device and the second subscriber device;
    the channel personalization engine configured to identify content associated with the non-textual category data and content associated with the subscriber interest category data;
    the channel personalization engine further configured to generate a customized subscriber channel for the subscriber, the customized subscriber channel configured to stream at least a portion of the content associated with the non-textual category data and at least a portion of the content associated with the subscriber interest category data via the computer network and internet connection to at least one of the first subscriber device and the second subscriber device, the customized subscriber channel including the content associated with the non-textual category data and the content associated with the subscriber interest category data, wherein the customized subscriber channel of the subscriber created by the channel personalization engine is generated at least in part responsive to the non-textual category data entered by the subscriber and the plurality of subscriber interest category data entered by the subscriber;

the channel personalization engine configured to stream, via the customized subscriber channel from the channel personalization engine, the portion of the content associated with the non-textual category data in a first format configured for display on the first subscriber device;

the channel personalization engine further configured to stream, via the customized subscriber channel from the channel personalization engine, the portion of the content associated with the subscriber interest category data in a second format configured for display on the second subscriber device during a time period of continuous transmission of the content associated with the non-textual category data from the channel personalization engine and the computer network in the first format configured for display on the first subscriber device; and the channel personalization engine further configured to receive, via the computer network and internet connection from a first user device, data entered into an interface of the first user device including at least one of second non-textual category data and user interest category data, wherein the first user device is a different device than the first subscriber device and the second subscriber device;

the channel personalization engine further configured to determine that a first user associated with the first user device has an interest in a portion of content of the subscriber channel, the determining at least in part responsive to the non-textual category data and the user interest category data entered by the first user via the first user device;

the channel personalization engine further configured to stream the portion of content of the subscriber channel to the first user via the first user device; and the channel personalization engine further configured to restrict the first user device's access of the subscriber channel to the portion of the content of the subscriber channel in which the first user associated with the first user device is determined to have the interest.

19. The channel personalization engine of claim 18, wherein the channel personalization engine is configured to provide, via the customized subscriber channel, the content associated with the non-textual category data to a plurality of users in the first format; and wherein the channel personalization engine is further configured to provide, via the customized subscriber channel, the content associated with the subscriber interest category data to the plurality of users in the second format.

20. The channel personalization engine of claim 18, wherein the channel personalization engine is configured to receive a plurality of user interest category data provided by a user; and wherein the channel personalization engine is further configured to provide to the user, via the customized subscriber channel, the content associated with the non-textual category data responsive to an evaluation of the subscriber interest category data and the user interest category data.

21. The channel personalization engine of claim 18, wherein the customized subscriber channel comprises a plurality of subchannels, and wherein the channel personalization engine is configured to identify a plurality of formats compatible with the first subscriber device and to provide one of the subchannels to the first subscriber device in the first format, wherein the first format includes one of the plurality of formats.

22. The channel personalization engine of claim 18, wherein the channel personalization engine is configured to access the data storage unit and to identify, via the computer network, the content associated with at least one of the non-textual category data and the content associated with the subscriber interest category data.

23. The channel personalization engine of claim 18, wherein the channel personalization engine is configured to access the data storage unit and to retrieve the content associated with at least one of the non-textual category data and the content associated with the subscriber interest category data; and wherein the first format includes an audio format, and wherein the second format includes a visual format.

24. The channel personalization engine of claim 18, wherein the content associated with the non-textual category data includes at least one of a music file, a video file, a news data file, and an advertisement file, and wherein the content associated with the subscriber interest category data includes at least one of a news category, a sports category, an entertainment category, a music category, a current event category, a professional category, and a hobby.

25. The channel personalization engine of claim 18, wherein the channel personalization engine is configured to simultaneously transmit, via the customized subscriber channel, the content associated with the non-textual category data in the first format to the first subscriber device, and the content associated with the subscriber interest category data in the second format to the second subscriber device.

26. The channel personalization engine of claim 25, wherein the first subscriber device includes a portable audio device, and wherein the second subscriber device includes at least one of a computer and a personal digital assistant, and wherein content associated with the non-textual category data and the content associated with the subscriber interest category data include data having common subject matter.

27. The channel personalization engine of claim 26 wherein the content associated with the non-textual category data includes a song, and wherein the content associated with the subscriber interest category data includes at least one of lyrics to the song, a video of an artist singing the song, a news article about a genre of music that includes the song, and an advertisement associated with the song.

28. A non-transitory computer-readable device with instructions thereon, wherein the instructions, when executed by at least one computing device having a channel personalization engine, cause one or more of the at least one computing device to perform the acts comprising:

receiving, by the one or more of the at least one computing device, from at least one of a first subscriber device associated with a subscriber and a second subscriber device associated with the subscriber via a computing network and internet connection, a selection of non-textual category data entered by the subscriber via an interface of one of the first subscriber device and the second subscriber device and a plurality of subscriber interest category data entered by the subscriber via the interface of one of the first subscriber device and the second subscriber device;

identifying content associated with the non-textual category data and content associated with the subscriber interest category data;

creating a customized subscriber channel associated with the subscriber and configured to stream at least a portion of the content associated with the non-textual category data via the computer network and internet connection to the subscriber via at least one of the first subscriber device and the second subscriber device, and the subscriber channel configured to stream at least a portion of the content associated with the subscriber interest category data via the computer network and internet connection to the subscriber via at least one of the first subscriber device and the second subscriber device, the subscriber channel including the content associated with the non-textual category data and including the content associated with the subscriber interest category data, wherein the customized subscriber channel of the subscriber created by the channel personalization engine is at least in part responsive to the non-textual category data entered by the subscriber and the plurality of subscriber interest category data entered by the subscriber;

streaming, through the subscriber channel from the channel personalization engine via the computer network and internet connection to the first subscriber device, the portion of the content associated with the non-textual category data to the subscriber in a first format configured for display on a first subscriber device; and streaming, through the subscriber channel from the channel personalization engine to the second subscriber device, the portion of the content associated with the subscriber interest category data to the subscriber in a second format configured for display on a second subscriber device during a time period of continuous transmission of the content associated with the non-textual category data from the channel personalization engine to the subscriber in the first format configured for display on the first subscriber device;

receiving, by the channel personalization engine via the computer network and internet connection from a first user device, data entered into an interface of the first user device including at least one of second non-textual category data and user interest category data, wherein the first user device is a different device than the first subscriber device and the second subscriber device;

determining, by the channel personalization engine, that a first user associated with the first user device has an interest in a portion of content of the subscriber channel, the determining at least in part responsive to the non-textual category data and the user interest category data entered by the first user via the first user device;

streaming the portion of content of the subscriber channel to the first user device via the computer network and internet connection; and restricting the first user device's access of the subscriber channel to the portion of the content of the subscriber channel in which the first user associated with the first user device is determined by the channel personalization engine to have the interest.

* * * * *

UNITED STATES PATENT AND TRADEMARK OFFICE
CERTIFICATE OF CORRECTION

PATENT NO. : 8,478,841 B2  
APPLICATION NO. : 12/143366  
DATED : July 2, 2013  
INVENTOR(S) : Kenneth C. Spitzer et al.

Page 1 of 1

It is certified that error appears in the above-identified patent and that said Letters Patent is hereby corrected as shown below:

On the Title page of the patent, at Item (76) Inventors: Inventor Kenneth J. Spitzer's middle initial should read: Kenneth C. Spitzer Signed and Sealed this  
Twenty-seventh Day of August, 2013

Teresa Stanek Rea  
*Acting Director of the United States Patent and Trademark Office*